G. M. EATON.
ELECTRIC LOCOMOTIVE.
APPLICATION FILED JAN. 7, 1914.
1,192,773.
Patented July 25, 1916.
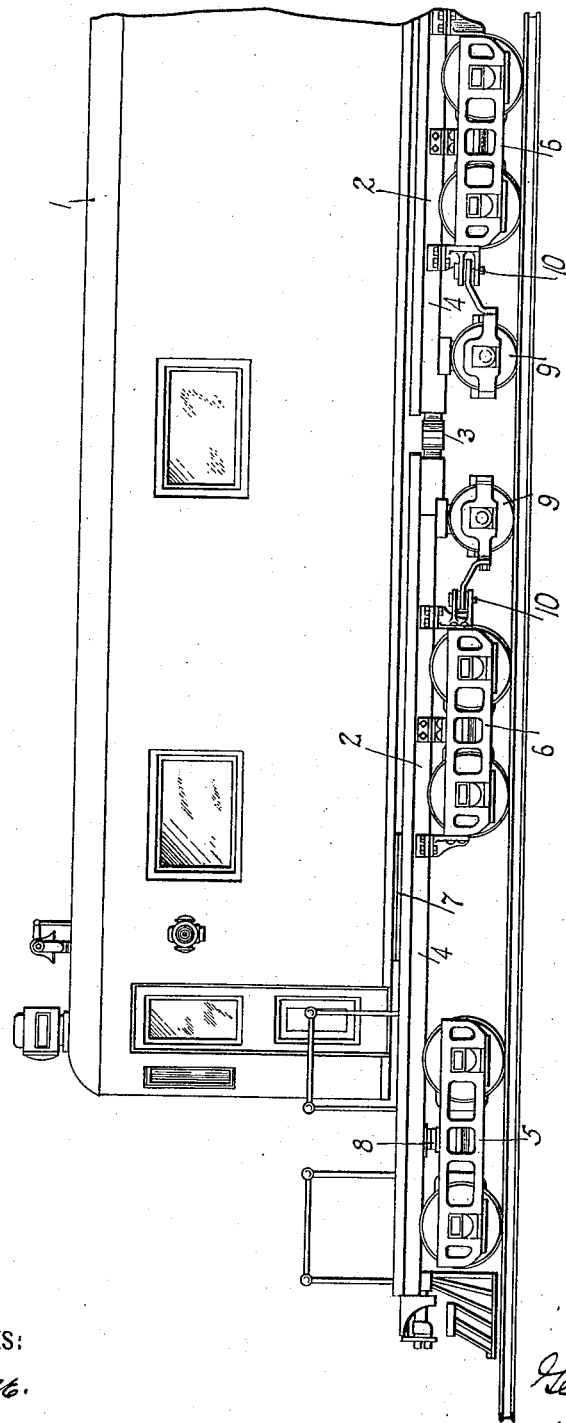

UNITED STATES PATENT OFFICE.

GEORGE M. EATON, OF PITTSBURGH, PENNSYLVANIA, ASSIGNOR TO WESTINGHOUSE ELECTRIC AND MANUFACTURING COMPANY, A CORPORATION OF PENNSYLVANIA.

ELECTRIC LOCOMOTIVE.

1,192,773.

Specification of Letters Patent.

Patented July 25, 1916.

Application filed January 7, 1914. Serial No. 810,769.

*To all whom it may concern:*

Be it known that I, GEORGE M. EATON, a citizen of the United States, and a resident of Pittsburgh, in the county of Allegheny and State of Pennsylvania, have invented a new and useful Improvement in Electric Locomotives, of which the following is a specification.

My invention relates to electric locomotives, and it has particular reference to the arrangement of trucks embodying the running gear.

The object of my invention is to provide a truck structure that shall be adapted to insure smooth riding qualities of a locomotive at high-speed operation, and particularly to prevent the usual lateral swing of the locomotive and undesirable side thrusts upon the rails.

Heretofore, it has been proposed to use an arrangement of trucks and running gears, which is similar in many respects to that shown and hereinafter described, but in actual commercial service, locomotives of this type have been found to be unsatisfactory at high-speed operation by reason of the poor tracking and a tendency to nose.

According to my invention, I propose to employ a plurality of guiding or tracking trucks, preferably of the radial type, which shall be pivotally associated with the inner ends of the complemental running gears and be disposed substantially under the middle portion of the cab body.

In the single figure of the accompanying drawing, a portion of a locomotive embodying my invention is shown in side elevation.

Referring to the drawing, a cab 1 is pivotally associated with a plurality of locomotive frames or running gears 2, which have an articulated connection 3 between them for preventing abnormal relative lateral movement. The locomotive frames 2 are of like construction and each comprises a frame structure 4 and a plurality of main trucks 5 and 6 which are associated with the frame structure 4 on opposite sides of the main pivotal connection 7 with the cab body 1. The end truck 5 has a pivotal connection 8 to the frame structure 4, while the truck 6 is rigidly associated therewith.

In order to accomplish the desired results and to overcome the difficulties hereinbefore referred to, I propose to employ a guiding truck 9, which is preferably of the radial type and which is pivotally connected to the rigid truck 6 or to the frame structure 4 at a point 10. The truck 9 is thus disposed substantially under the middle of the cab body 1 and is somewhat removed from the rigid truck 6, whereby it serves to guide or direct the movement of the running gear 2, and thus eliminates, to a very considerable degree, the side thrusts and jolts to which running gears having rigid trucks of this type are subjected. In this manner, the tracking of each of the running gears is improved and, hence, the poor riding qualities heretofore experienced with locomotives of this general type are obviated.

I desire that only such limitations shall be imposed as are indicated in the appended claims.

I claim as my invention:

1. In a locomotive, the combination with a cab, of a plurality of running gears pivotally associated therewith, each comprising a frame structure, an end truck pivotally associated therewith, another truck having a rigid connection thereto and a guiding truck disposed adjacent to said rigidly associated truck and pivotally associated therewith.

2. In a locomotive, the combination with a single cab, of a plurality of articulated running gears pivotally associated therewith and each embodying a rigid central truck, a pivotal end truck, and a pivotal guiding truck disposed substantially in the middle of the locomotive.

3. In a locomotive, the combination with a cab, of a plurality of articulated running gears pivotally associated with said cab and each comprising a pivotal end truck and a rigidly mounted middle truck disposed on the opposite side of the pivotal connection between said cab and said running gear, and a radial guiding truck pivotally associated with said rigid truck and located substantially in the middle of the locomotive.

4. In a locomotive, the combination with a cab, of a plurality of running gears associated therewith and each comprising pivotal end trucks and a rigid truck intermediate said end trucks, said cab being associated with each running gear between one of the end trucks and the intermediate truck.

5. In a locomotive, the combination with a cab, of a plurality of running gears associated therewith and each comprising a pivotal end truck, a radial end truck and an intermediate rigid truck, said cab being associated with each running gear between the pivotal truck and the rigid truck.

6. In a locomotive, the combination with a cab, of a plurality of running gears associated therewith and each comprising a pivotal four wheel outer end truck, a radial two wheel inner end truck and an intermediate rigid truck, said cab being associated with each running gear between the pivotal truck and the rigid truck.

7. In a locomotive, the combination with a cab, of a plurality of running gears having pivotal connections with said cab and each comprising a rigid truck and a pivotal end truck disposed on one side of said pivotal connection and a second pivotal end truck disposed on the opposite side thereof.

In testimony whereof, I have hereunto subscribed my name this 31st day of Dec. 1913.

GEORGE M. EATON.

Witnesses:
G. R. IRWIN,
B. B. HINES.

Copies of this patent may be obtained for five cents each, by addressing the "Commissioner of Patents, Washington, D. C."